…

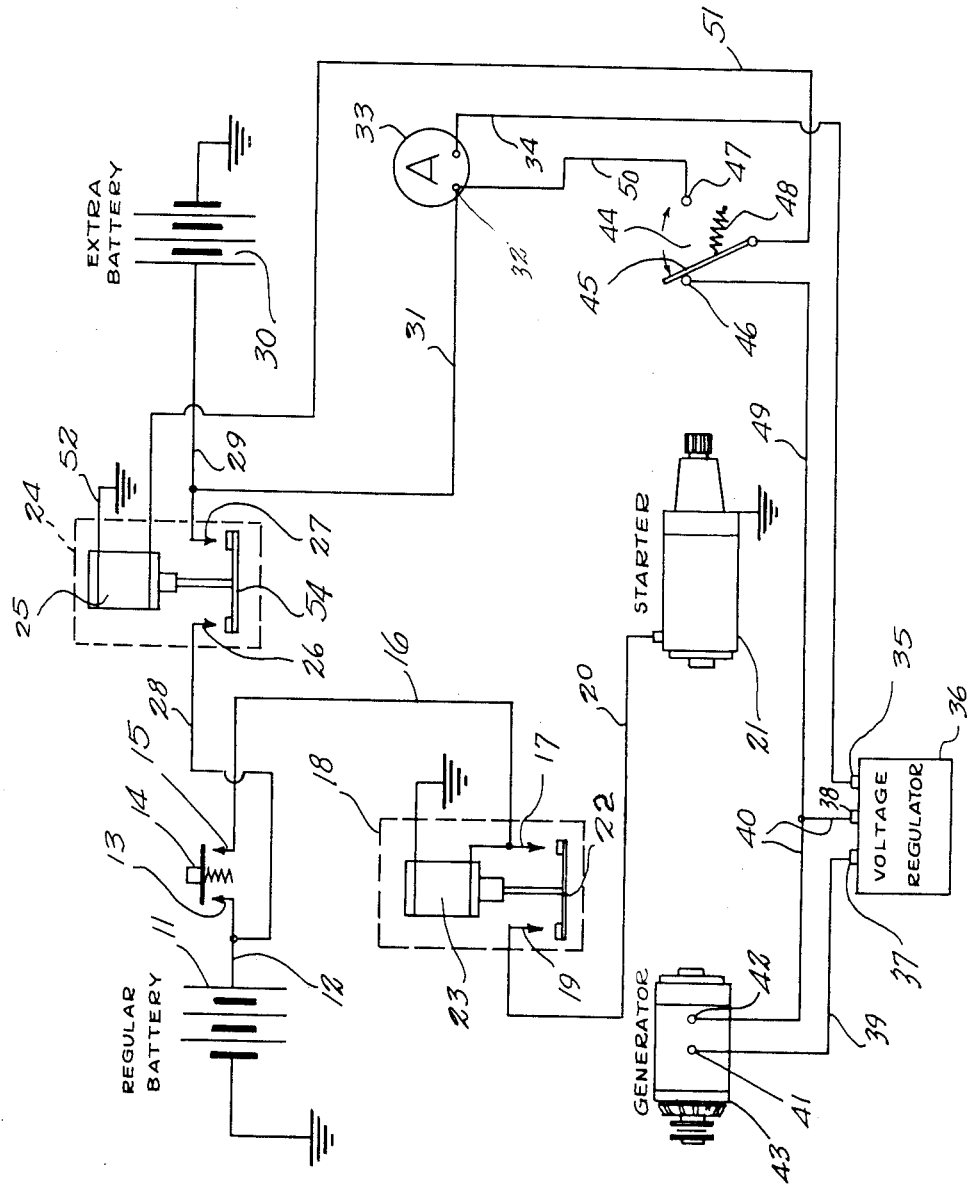

United States Patent Office 2,729,750
Patented Jan. 3, 1956

2,729,750
MOTOR VEHICLE ELECTRICAL SYSTEM

Carson Owen Draper and Dale A. Draper, Provo, Utah

Application June 29, 1954, Serial No. 440,042

4 Claims. (Cl. 290—36)

This invention relates to motor vehicles, and more particularly to an improved motor vehicle electrical system provided with an auxiliary battery which may be employed for starting the engine of the vehicle in the event that the normal battery is depleted.

A main object of the invention is to provide a novel and improved motor vehicle electrical system which involves simple components, which is easy to install, and which is arranged so that the accessory devices of the vehicle such as the lamps, radio, heater, or the like may be employed without effecting the battery employed to energize the starting motor of the vehicle, these devices being provided with an auxiliary battery for energizing same, said auxiliary battery being available for use, at times, for energizing the motor vehicle starting motor.

A further object of the invention is to provide an improved motor vehicle electrical system which provides a stand-by auxiliary battery which may be employed in place of the normal starting battery when said normal starting battery is depleted, the auxiliary battery being otherwise employed for energizing the auxiliary devices of the motor vehicle, such as the lamps, radio, heater, or the like, means being provided for connecting both of the batteries to the motor vehicle generator for charging same when the motor vehicle is operating, and further means being provided for at times substituting the auxiliary battery for the normal starting battery so that the starting motor of the vehicle may be operated from the auxiliary battery when necessary.

Further objects and advantages of the invention will become apparent from the following description and claims, and from the accompanying drawings, wherein:

The single figure shows an improved motor vehicle electrical system according to the present invention.

Referring to the drawings, 11 designates the normal battery employed for starting the motor vehicle, said battery having one terminal thereof connected by a wire 12 to a stationary contact 13 of the starting switch 14. The other contact of said starting switch, shown at 15, is connected by a wire 16 to the relay contact 17 of the starting relay 18. The other relay contact, shown at 19, is connected by a wire 20 to the ungrounded terminal of the starting motor 21 in the usual manner. The armature 22 of the relay is normally disengaged from the contacts 17 and 19, and engages said contacts when the relay winding, shown at 23, is energized, to connect the starting motor 21 to the battery 11. As shown, one terminal of the starting solenoid 23 is grounded and the other terminal is connected to the contact 17 in the conventional manner.

Designated at 24 is a relay having the solenoid winding 25 and the respective contacts 26 and 27. The contact 26 is connected by a wire 28 to the wire 12. The contact 27 is connected by a wire 29 to one terminal of the auxiliary battery 30, the other terminal of said battery being grounded, and being of like polarity with the grounded terminal of the normal battery 11. The wire 29 is connected by a wire 31 to one terminal 32 of the ammeter 33, the other terminal of said ammeter being connected by a wire 34 to the battery terminal 35 of a conventional voltage regulator 36. The respective generator terminals 37 and 38 of the voltage regulator are connected by respective wires 39 and 40 to the respective terminals 41 and 42 of the conventional generator 43.

Designated at 44 is a single pole double-throw switch having the pole 45 and the respective contacts 46 and 47. The pole 45 is biased into engagement with the contact 46 by a spring 48, and normally engages contact 46, as shown in the figure. Contact 46 is connected by a wire 49 to the wire 40. Contact 47 is connected by a wire 50 to the ammeter terminal 32. The pole 45 is connected by a wire 51 to one terminal of the winding 25 of relay 24. The other terminal of said winding is grounded, as by a wire 52.

As shown in the figure, normally, the battery 30 is disconnected from the battery 11 since the relay 24 is normally deenergized. When the vehicle is started, as by closing the push button switch 14, the starting motor 21 is energized by the energization of the starting relay 18 and the closure of the contacts 19 and 17 by the armature 22 of the starting relay 18. When the motor engine starts, the generator 43 delivers output voltage, and causes the relay 24 to be energized. The relay 24 is energized by the following circuit: Grounded wire 52, winding 25, wire 51, switch pole 45, contact 46, wire 49, and the generator terminal 42, which is at generator potential with respect to ground. When the relay 24 becomes energized, the contacts 26 and 27 are connected by the relay armature, shown at 54, causing the battery 30 to be connected in parallel with the battery 12 and causing both batteries to be simultaneously charged from the generator through a circuit including the wire 31, the ammeter 33, the wire 34, the voltage regulator contact 35, the internal contacts of the voltage regulator, the terminal 38 of the voltage regulator, the wire 40, and the generator terminal 42, which is at charging potential with respect to ground.

The battery 30 may be employed for energizing the auxiliary devices of the motor vehicle, such as the lamps, radio, heater, and the like, said devices being connected to a circuit separate from the circuit associated with the starting battery 11. The circuit for the auxiliary devices of the motor vehicle forms no part of the present invention and hence is not shown in the drawing.

Should the battery 11, for any reason, become so depleted that it is unable to operate the starting motor 21, the auxiliary battery 30 may be employed for this purpose by manually moving the switch pole 45 into engagement with the contact 47. This energizes the relay 24 by a circuit comprising battery 30, wire 29, wire 31, wire 50, contact 47, switch pole 45, wire 51, the winding 25 of relay 24 and the grounded wire 52. The energization of relay 24 causes the contacts 26 and 27 of said relay to be connected together by the armature 54, placing the auxiliary battery 30 in parallel with the normal battery 11. Therefore, while the pole 45 is being held in contact with the switch contact 47, the starter switch 14 may be closed, whereby the starting relay 23 and the starter 21 may be energized from the auxiliary battery 30. After the engine has started, the switch pole 45 may be released, since the relay 24 will become energized from the generator 43 by the circuit above described, whereby the battery 30 will be maintained in parallel connection with the battery 11, and whereby both batteries may be simultaneously charged from the vehicle generator 43.

While a specific embodiment of an improved motor vehicle electrical system has been disclosed in the foregoing description, it will be understood that various modifications within the spirit of the invention may occur to those skilled in the art. Therefore, it is intended that

What is claimed is:

1. In a motor vehicle electrical system, a starting motor, a generator, a first battery, a second battery, a relay having its winding normally connected to said generator, a circuit controlled by said relay and arranged to connect said batteries to said generator in parallel for charging the batteries in response to energization of said relay by said generator, circuit means including a normally open control switch arranged to connect said first battery to said starting motor, and switch means arranged for at times disconnecting the winding of said relay from said generator and connecting said relay winding to said second battery, whereby said second battery is connected by said relay in parallel with the first battery and may be utilized for operating said starting motor.

2. In a motor vehicle electrical system, a starting motor, a generator, a first battery, a second battery, a relay having its winding normally connected to said generator, said relay including contacts which are closed when the relay is energized, circuit means including said contacts arranged to connect said batteries in parallel and being arranged to connect said batteries to said generator in parallel for charging the batteries in response to energization of said relay by said generator, circuit means including a normally open control switch arranged to connect said first battery to said starting motor, and switch means arranged for at times disconnecting the winding of said relay from said generator and connecting said relay winding to said second battery, whereby said second battery is connected by said relay in parallel with the first battery and may be utilized for operating said starting motor.

3. In a motor vehicle electrical system, a starting motor, a generator, a first battery, a second battery, a relay having its winding normally connected to said generator, said relay including contacts which are closed when the relay is energized, circuit means including said contacts arranged to connect said batteries in parallel and being arranged to connect said batteries to said generator in parallel for charging the batteries in response to energization of said relay by said generator, circuit means, including a normally open control switch, arranged to connect said first battery to said starting motor, and a single pole double-throw switch having its pole connected to the winding of said relay, said switch having two contacts, one of which is normally engaged by said pole and is connected to said generator, the other contact being connected to said second battery, said double-throw switch being arranged so that the relay winding may be at times disconnected from the generator and connected to said second battery by operating said double-throw switch, whereby said second battery is connected by said relay in parallel with the first battery and may be utilized for operating said starting motor.

4. In a motor vehicle electrical system, a starting motor, a generator, a first battery, a second battery, a relay having contacts which are closed only when the relay is energized, means including said contacts interconnecting the terminals of common polarity of said batteries, whereby the batteries are connected in parallel when the relay is energized, circuit means including a normally open control switch, connecting the first battery to said starting motor, a single pole double-throw switch having a pole and first and second contacts engageable by said pole, means biasing said pole into engagement with the first contact, means connecting said first contact to said generator, means connecting said pole to the winding of said relay, whereby the relay may be energized by the generator and whereby the batteries may be charged in parallel from said generator, and means connecting the second contact to said second battery and being arranged to energize said relay from said second battery when said pole engages said second contact, whereby said batteries will be connected in parallel and whereby said second battery may be utilized for operating said starting motor.

References Cited in the file of this patent

UNITED STATES PATENTS

| | | |
|---|---|---|
| 1,288,938 | Leonard | Dec. 24, 1918 |
| 1,898,370 | Hughes et al. | Feb. 21, 1933 |
| 2,085,275 | Schmidt | June 29, 1937 |
| 2,096,378 | Mitchell | Oct. 19, 1937 |
| 2,152,405 | Dreischerf | Mar. 28, 1939 |
| 2,564,957 | Cermak | Aug. 21, 1951 |
| 2,629,059 | Baumheckel | Feb. 17, 1953 |
| 2,692,953 | Markett, Jr. | Oct. 26, 1954 |

OTHER REFERENCES

"Popular Science" (December 1946), p. 138.